United States Patent Office 3,234,502
Patented Feb. 8, 1966

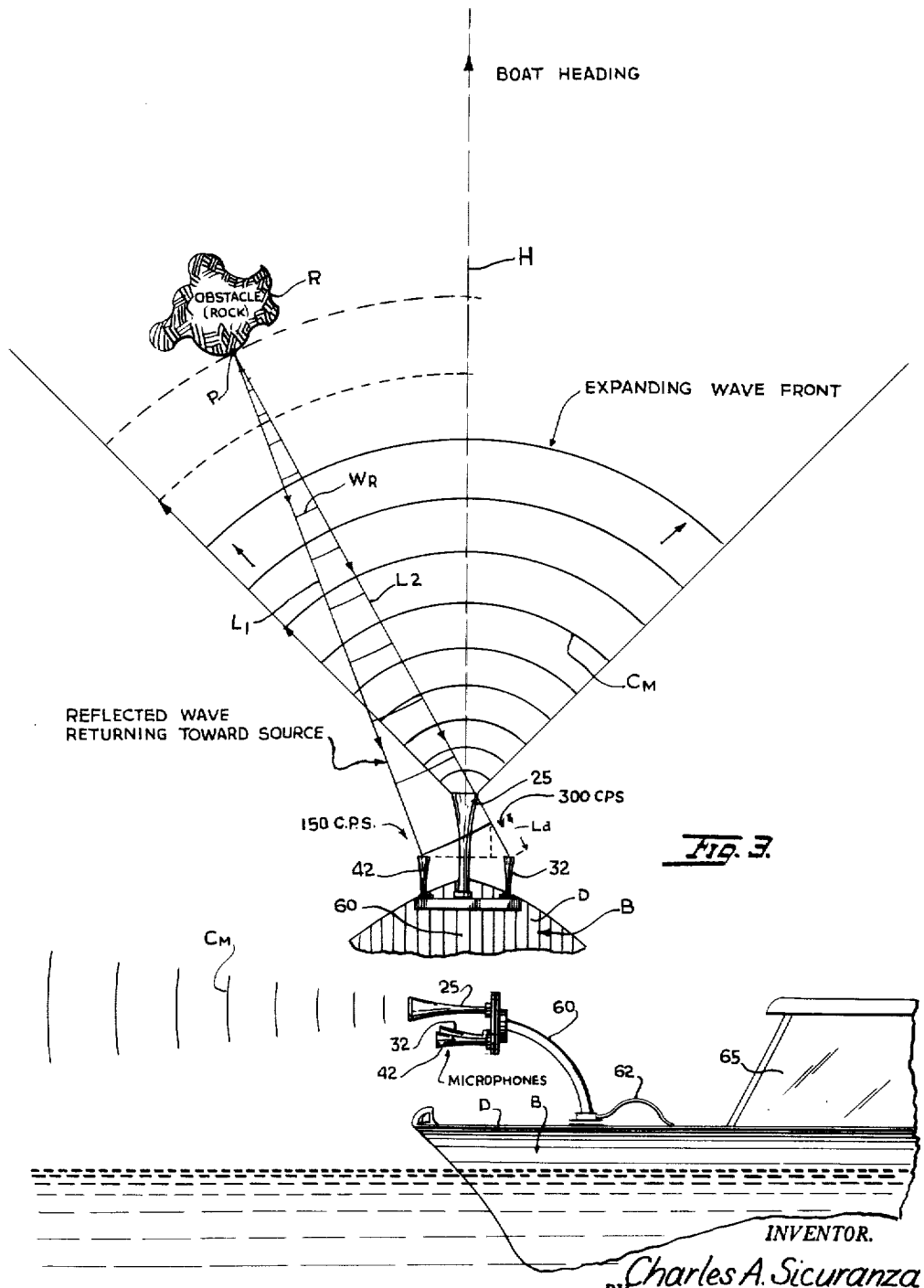

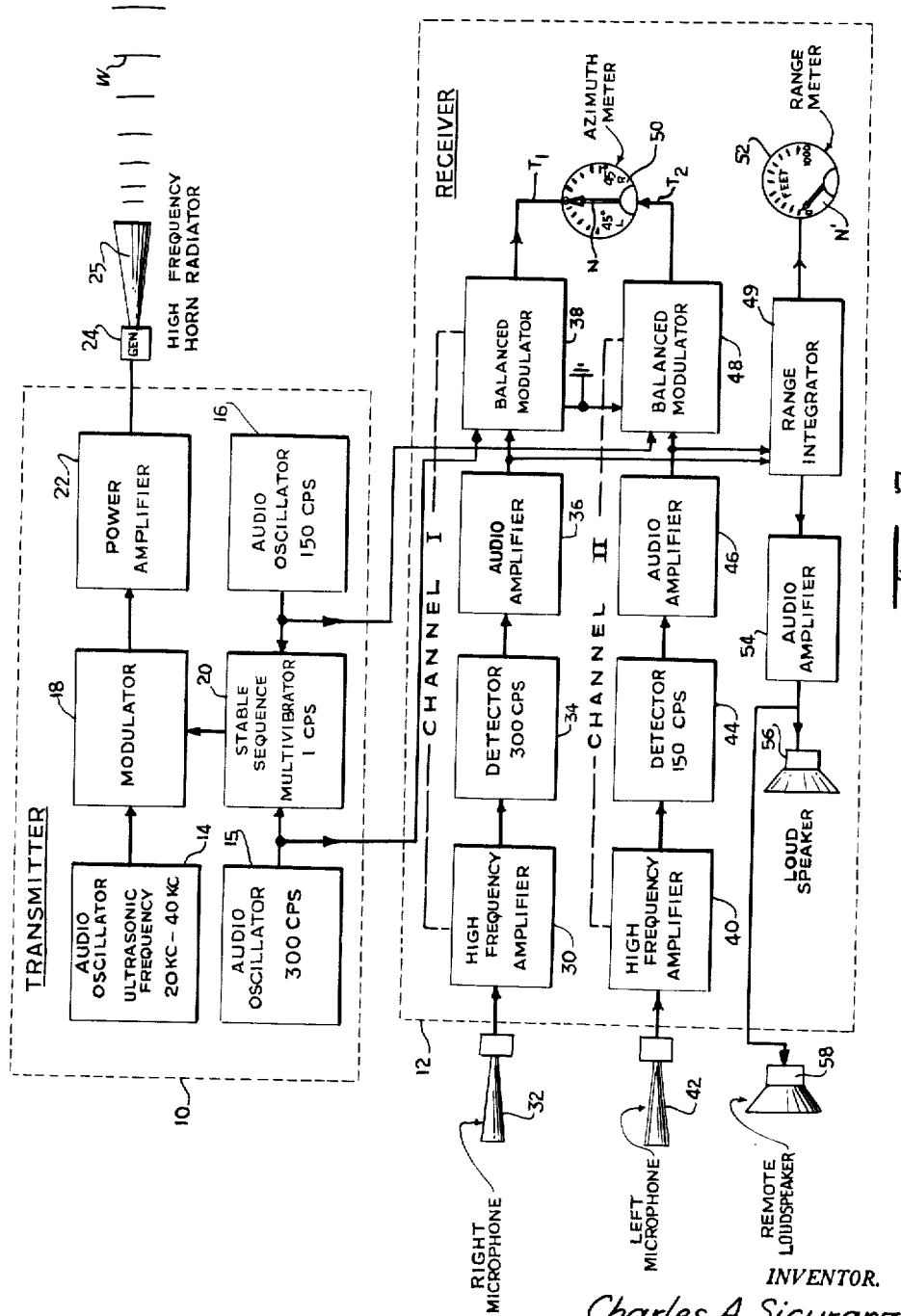

3,234,502
ECHO RANGING APPARATUS
Charles A. Sicuranza, 20 Ballad Lane, Hicksville, N.Y.
Filed July 29, 1963, Ser. No. 298,078
10 Claims. (Cl. 340—1)

This invention relates to apparatus for warning of the presence of obstacles in the path of a boat; and more particularly concerns transmitter-receiver apparatus employing reflected ultrasonic compressional waves which are converted to visual and audible signals for providing said warning.

The invention differs from conventional sonar systems which operate below the water surface for echo and sound ranging purposes, and differs from conventional radar system which employ radio frequency electromagnetic waves and display echoes on oscilloscope screens.

According to the invention, inaudible high pitched modulated compressional waves are emitted in air by an ultrasonic radiator such as a horn driven by an ultrasonic wave generator. The expanding wave front, when intercepted by an object projecting upwardly above the surface of the sea is partially reflected back toward the source of the wave. Two ultrasonic microphones spaced apart pick up the reflected compressional wace energy. The modulated ultrasonic signals picked up by the two microphones are converted to electrical signals which are demodulated and passed through separate channels of a two-channel receiver. The receiver is provided with a range integrator and calibrated meter which indicates distance or range from the object or obstacle to the apparatus. The azimuth or direction of the obstacle with respect to the apparatus is indicated by a calibrated azimuth meter whose reading is related to differences in phase of the reflected waves picked up by the two microphones. An audio amplifier and loudspeaker are provided in the receiver to produce audible tones of different pitches indicating location of the obstacles to starboard (right), to port (left), or directly ahead.

It is therefore one object of the invention to provide an apparatus which may be used on a boat to indicate the presence of obstacles and objects above water, in the path of or near the path of the boat.

Another object is to provide an obstacle warning apparatus employing emitted and reflected modulated ultrasonic compressional waves, the reflected compressional waves being converted in a duel channel receiver to electrical signals, the electrical signals being in turn converted to visual and audible signals which indicate range, direction and azimuth of the obstacle.

For further comprehension of the invention, and of the objects and advantages thereof, reference will be had to the following description and accompanying drawings, and to the appended claims in which the various novel features of the invention are more particularly set forth.

FIG. 1 is a side elevational view of the bow end of a boat mounted thereon parts of apparatus employed in the invention.

FIG. 2 is a diagram showing components of the apparatus schematically.

FIG. 3 is a plan view of the bow end of the boat with a graphic representation of waves, used in explaining the invention.

Referring first to FIG. 2, it will be noted that the apparatus includes a transmitter 10 and a receiver 12. The transmitter includes three audio oscillators 14, 15 and 16. Audio oscillator 14 emits a signal of ultrasonic frequency of about 20 kilocycles to about 40 kilocycles per second. Audio oscillator 15 emits a signal of about 300 cycles per second. Oscillator 14 is connected to a modulator 18. Oscillators 15 and 16 are connected to an astable sequence multivibrator 20 which in turn is connected to the modulator 18. The output of the modulator 18 is connected to a power amplifier 22 which drives an ultrasonic transducer or generator 24 to which is connected an air impedance matching horn 25. The horn emits inaudible compressional waves including a 20 kc. to 40 kc. carrier upon which are modulated two audio frequencies of 150 c.p.s. and 300 c.p.s.

The carrier frequency is modulated in modulator 18 in sequence alternately for one second by the 150 c.p.s. frequency and then for one second by the 300 c.p.s. frequency. The changes in modulating frequency occur once each second as they are passed by the multivibrator 20 which acts as a gate passing first one modulating frequency and then the other one. The power amplifier 22 is a conventional type of audio amplifier which increases the output power of the modulated carrier sufficiently to drive the ultrasonic generator 24. This generator may be of piezoelectric, magnetostrictive or other suitable type. The horn is highly directional and emits the modulated ultrasonic frequency as inaudible compressional air waves.

Receiver 12 has two similar channels I and II. In channel I is a tuned high frequency amplifier 30 connected at its input to a first ultrasonic microphone 32. The output of amplifier 30 is connected to a detector or demodulator 34. The detector is connected to an audio amplifier 36. The output of amplifier 36 is connected to a balanced modulator 38 and to a range integrator 39.

In channel II is another tuned high frequency amplifier 40 connected at its input to a microphone 42 and at its output to a detector or demodulator 44. The output of the detector is connected to audio amplifier 46 which is connected to balanced modulator 48 and to range integrator 49. The outputs of modulators 38, 48 are connected to a phase meter 50 calibrated in azimuth degrees. The range integrator has one output connected to a calibrated range meter 52 and another output connected to an audio amplifier 54 which drives a loudspeaker 56 and remote loudspeaker 58. The outputs audio oscillators 15 and 16 are further connected to balanced modulator 38 and balanced modulator 48 respectively.

Meter 50 is calibrated in degrees from 45° left through 0° to 45° right. Meter 52 is calibrated in feet from zero to 1000 feet.

FIGS. 1 and 2 show the horn 25 carried on a support pipe 60 at the bow end of the boat B, and directed forward. The pipe is secured at its lower end to deck D. Microphones 32 and 42 are supported just below the horn 25 by pipe 60. The microphones are directed forward on opposite sides of the horn but parallel to the horn axis. A cable 62 connects the horn and microphones to the transmitter 10 and receiver 12 which may be located in pilot's cabin 65.

In operation of the apparatus, horn 25 emits ultrasonic frequency compressional waves W modulated sequentially at two different audio frequencies, indicated as $C_M$ in FIGS. 1 and 3. Suppose the expanding wave front encounters an obstacle R at a point P. The modulated waves will be reflected as indicated by $W_R$. The reflected waves will be picked up by both microphones 32, 42. It will be noted that the path length L1 is shorter to microphone 42 than path length L2 to microphone 32. This difference $L_d$ in path length results in a difference in travel time or phase between the waves arriving at the two microphones.

The received waves picked up at the microphones are passed to the inputs of the amplifiers 30, 40 in channels I and II. The waves are demodulated in detectors 34, 44 to suppress the ultrasonic carrier and recover the higher audio frequency in detector 34 and lower audio frequency in detector 44. These audio frequencies are amplified in amplifiers 36, 46 respectively and are passed to balanced modulators 38, 48. In the balanced modulators the detected audio frequency signals are beat against audio frequency signals generated by audio oscillators 15 and 16 respectively. The balanced modulators produce outputs which are applied in opposition to terminals T1, T2 phase meter 50. This meter has a needle N which swings to the right to indicate numerically in degrees the location of obstacle R to starboard of boat heading H, or which swings to the left to indicate numerically in degrees the location of obstacle R to port of boat loading H. The phase meter is calibrated so that for each lagging phase difference between emitted and returning 150 c.p.s. signals applied to meter terminal T1 at each azimuth position of obstacle R, there will be a different but corresponding lagging phase difference between emitted and returning 300 c.p.s. signals applied to meter terminal T2. Thus the needle N points steadily to a single reading at each azimuth position of obstacle R. Only when the obstacle is at 0° azimuth or dead ahead on line H will the lagging phase difference between the two 150 c.p.s. signals applied to terminal T1 be the same as the lagging phase difference between the two 300 c.p.s. signals applied to terminal T2. Thus in this situation the meter needle N will remain steady at the 0° azimuth reading of meter 50.

The distance of the boat B to the obstacle R is indicated by range meter 52. The amplitude of the reflected waves received by the two microphones will be inversely proportional to the square of the distance from boat B to obstacle R. The outputs of audio amplifiers 36, 46 are applied to a conventional power integrator circuit 49. Alternatively the outputs of detectors 34, 44 may be applied to the integrator 49. In any case, integrator 49 integrates the successive audio pulses and applies them to the range meter 52. This meter is a conventional type of ammeter, voltmeter or wattmeter and indicates by the deflection of its N' the magnitude of energy applied to it. The meter is calibrated in feet to indicate the obstacle distance numerically.

It is also desirable to provide an audible warning of the presence of an obstacle R. The amplifier 54 receives from the range integrator signals whose frequency will depend on whether the obstacle is located to the right or left of the boat heading. A low pitched tone emitted by loudspeakers 56, 58 may indicate an obstacle is located to the left of the boat; a noticeable higher pitched tone may indicate an obstacle to the right of the boat and an intermediate pitched tone may indicate an obstacle is located straight ahead. One loudspeaker 56 will preferably be located at the pilot's position or cabin 65. The other loudspeaker 58 can be remotely located below deck, at the stern or other position to alert personnel of the presence of an obstacle and its general location ahead, to port or to starboard.

The transmitter-receiver is preferably assembled in a single small cabinet with the loudspeaker 56, placed close by. The meters 50, 52 will be located at the front of the cabinet for easily viewing. The transmitter-receiver assembly will be connected to the horn 25 and microphones by the single cable 52 which contains all necessary wires in an insulated jacket.

The invention makes it possible to provide a boat pilot with a compact, reliable, accurate apparatus to indicate visually and audibly the presence and location of obstacles relative to the location and heading of the boat.

An important advantage of the invention is the short range (0–1000 feet) at which it operates accurately, far shorter than is possible with any single type of radar system. The apparatus is relatively inexpensive to manufacture and install and fulfills a long felt need in the boat navigation field.

If the equipment is miniaturized by using transistors, printed circuits, etc., it can be used for other purposes. For example, it can be adapted in manufacturing obstacle locators for blind pedestrians. It can be used on automobiles and other land vehicles. It can be installed in fixed locations in lighthouses, etc.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. Apparatus for detecting an obstacle in the vicinity of a boat, comprising a means for generating and radiating in air compressional waves of ultrasonic frequency modulated sequentially by waves of two different audio frequencies, a pair of microphones carried by the boat and disposed on opposite sides of the forward path of travel of said boat to pick up the modulated compressional waves after reflection in air from said obstacle, a receiver having two channels, each of said channels including an ultrasonic frequency tuned electrical amplifier, a demodulator, audio amplifier and balanced modulator all connected together in sequence, means for applying signals of said two different audio frequencies to the balanced modulators respectively of the two channels, said microphones being connected to the tuned amplifiers respectively, and a phase meter having opposing input terminals and calibrated with azimuth indications corresponding to phase differences of signals applied to opposing input terminals of the phase meter, said phase meter being connected to the balanced modulators of both channels for indicating any difference in phase between the signals applied by the modulators to respective terminals of the phase meter, whereby said meter indicates the azimuth of location of said obstacle with respect to the forward path of travel of the boat.

2. Apparatus for detecting an obstacle in the vicinity of a boat, comprising a means for generating and radiating in air compressional waves of ultrasonic frequency modulated sequentially by waves of two different audio frequencies, a pair of microphones carried by the boat and disposed on opposite sides of the forward path of travel of said boat to pick up the modulated compressional waves after reflection in air from said obstacle, a receiver having two channels, each of said channels including an ultrasonic frequency tuned electrical amplifier, a demodulator, audio amplifier and balanced modulator all connected together in sequence, means for applying signals of said two different audio frequencies to the balanced modulators respectively of the two channels, said microphones being connected to the tuned amplifiers respectively, and a phase meter having opposing input terminals and calibrated with azimuth indications corresponding to phase differences of signals applied to opposing input terminals of the phase meter, said phase meter being connected to the balanced modulators of both channels for indicating any difference in phase between the signals applied by the modulators to respective terminals of the phase meter, whereby said meter indicates the azimuth of location of said obstacle with respect to the forward path of travel of the boat, an integrating circuit connected to the audio amplifiers of both channels for integrating amplified alternately detected audio signals obtained from the demodulators of both channels, and a range meter calibrated to indicate distances and connected to the integrating circuit, whereby the range meter indicates the distance from the obstacle to the boat.

3. Apparatus for detecting an obstacle in the vicinity of a boat, comprising a means for generating and radiating in air compressional waves of ultrasonic frequency modulated sequentially by waves of two different audio frequencies, a pair of microphones carried by the boat and disposed on opposite sides of the forward path of travel of said boat to pick up the modulated compressional waves after reflection in air from said obstacle, a receiver having two channels, each of said channels including an ultrasonic frequency tuned electrical amplifier, a demodulator, audio amplifier and balanced modulator all connected together in sequence, means for applying signals of said two different audio frequencies to the balanced modulators respectively of the two channels, said microphones being connected to the tuned amplifiers respectively, and a phase meter having opposing input terminals and calibrated with azimuth indications corresponding to phase differences of signals applied to opposing input terminals of the phase meter, said phase meter being connected to the balanced modulators of both channels for indicating any difference in phase between the signals applied by the modulators to respective terminals of the phase meter, whereby said meter indicates the azimuth of location of said obstacle with respect to the forward path of travel of the boat, an integrating circuit connected to the audio amplifiers of both channels for integrating amplified alternately detected audio signals obtained from the demodulators of both channels, and a range meter calibrated to indicate distances and connected to the integrating circuit, whereby the range meter indicates the distance from the obstacle to the boat, another audio amplifier connected to the integrating circuit and at least one loudspeaker connected to said other audio amplifier whereby the loudspeaker emits sounds whose pitch depends on the position of said obstacle with respect to the path of travel of the boat.

4. Apparatus for detecting an obstacle in the vicinity of a boat, comprising a means for generating and radiating in air compressional waves of ultrasonic frequency modulated sequentially by waves of two different audio frequencies, a pair of microphones carried by the boat and disposed on opposite sides of the forward path of travel of said boat to pick up the modulated compressional waves after reflection in air from said obstacle, a receiver having two channels, each of said channels including an ultrasonic frequency tuned electrical amplifier, a demodulator, audio amplifier and balanced modulator all connected together in sequence, means for applying signals of said two different audio frequencies to the balanced modulators respectively of the two channels, said microphones being connected to the tuned amplifiers respectively, an integrating circuit connected to the audio amplifiers of both channels for integrating amplified alternately detected audio signals obtained from the demodulators of both channels, and a range meter calibrated to indicate distances and connected to the integrating circuit, whereby the range meter indicates the distance from the obstacle to the boat.

5. Apparatus for detecting an obstacle in the vicinity of a boat, comprising a means for generating and radiating in air compressional waves of ultrasonic frequency modulated sequentially by waves of two different audio frequencies, a pair of microphones carried by the boat and disposed on opposite sides of the forward path of travel of said boat to pick up the modulated compressional waves after reflection in air from said obstacle, a receiver having two channels, each of said channels including ultrasonic frequency tuned electrical amplifier, a demodulator, audio amplifier and balanced modulator all connected together in sequence, means for applying signals of said two different audio frequencies to the balanced modulators respectively of the two channels, said microphones being connected to the tuned amplifiers respectively; an integrating circuit connected to the audio amplifiers of both channels for integrating amplified alternately detected audio signals obtained from the demodulators of both channels, and a range meter calibrated to indicate distances and connected to the integrating circuit, whereby the range meter indicates the distance from the obstacle to the boat; another audio amplifier connected to the integrating circuit and at least one loudspeaker connected to said other audio amplifier whereby the loudspeaker emits sounds whose pitch depends on the position of said obstacle with respect to the path of travel of the boat.

6. Apparatus for detecting an object with respect to a moving vehicle comprising a transmitter including an ultrasonic frequency oscillator for generating an ultrasonic frequency carrier, a modulator, an astable multivibrator, two audio oscillators generating signals of two different audio frequencies, said audio oscillators being connected to opposite sides of said multivibrator so that said multivibrator passes in turn alternately signals produced by the two audio oscillators, said ultrasonic frequency oscillator and said multivibrator being connected to said modulator for modulating the alternately passed audio frequency signals upon said carrier, an amplifier connected to the modulator for amplifying the modulated carrier, and an ultrasonic frequency compressional wave generator connected to the amplifier generating and radiating in air an ultrasonic frequency carrier modulated sequentially by two audio frequencies; a receiver having a pair of microphones carried by said vehicle and disposed on opposite sides of the forward path of travel of said vehicle to pick up the modulated compressional wave carrier after reflection in air from said object, two electrical channels each including an ultrasonic frequency tuned amplifier, a demodulator, and balanced modulator all connected together in sequence, means connecting the two audio oscillators of the transmitter to the balanced mdulators respectively, and a phase meter having opposing input terminals and calibrated with azimuth indications corresponding to phase differences of signals applied to opposing input terminals of the phase meter, said phase meter being connected to the balanced modulators of both channels for indicating any difference in phase between signals applied by the modulators to respective terminals of the phase meter, whereby said meter indicates the azimuth of location of said object with respect to the forward path of travel of said vehicle.

7. Apparatus for detecting an object with respect to a moving vehicle comprising a transmitter including an ultrasonic frequency oscillator for generating an ultrasonic frequency carrier, a modulator, an astable multivibrator, two audio oscillators generating signals of two different audio frequencies, said audio oscillators being connected to opposite sides of said multivibrator so that said multivibrator passes in turn alternately signals produced by the two audio oscillators, said ultrasonic frequency oscillator and said multivibrator being connected to said modulator for modulating the alternately passed audio frequency signals upon said carrier, an amplifier connected to the modulator for amplifying the modulated carrier, and an ultrasonic frequency compressional wave generator connected to the amplifier generating and radiating in air an ultrasonic frequency carrier modulated sequentially by two audio frequencies; a receiver having a pair of microphones carried by said vehicle and disposed on opposite sides of the forward path of travel of said vehicle to pick up the modulated compressional wave carrier after reflection in air from said object, two electrical channels each including an ultrasonic frequency tuned amplifier, a demodulator, and balanced modulator all connected together in sequence, means connecting the two audio oscillators of the transmitter to the balanced modulators respectively, and a phase meter having opposing input terminals and calibrated with azimuth indications corresponding to phase differences of signals applied to opposing input terminals of the phase meter, said phase meter being connected to the balanced modulators of both channels for indicating any difference in phase between signals applied by the modulators to respective terminals of the phase meter, whereby said meter indicates the azimuth of location of said object with respect to the forward path of travel of said vehicle; an integrating circuit connected to the audio amplifiers of both channels for integrating amplified alternately detected audio signals obtained from the demodulators of both channels, and a range meter calibrated to indicate distances and connected to the integrating circuit, whereby the range meter indicates the distance from the object to the vehicle.

8. Apparatus for detecting an object with respect to a moving vehicle comprising a transmitter including an ultrasonic frequency oscillator for generating an ultrasonic frequency carrier, a modulator, an astable multivibrator, two audio oscillators generating signals of two different audio frequencies, said audio oscillators being connected to opposite sides of said multivibrator so that said multivibrator passes in turn alternately signals produced by the two audio oscillators, said ultrasonic frequency oscillator and said multivibrator being connected to said modulator for modulating the alternately passed audio frequency signals upon said carrier, an amplifier connected to the modulator for amplifying the modulated carrier, and a ultrasonic frequency compressional wave generator connected to the amplifier generating and radiating in air an ultrasonic frequency carrier modulated sequentially by two audio frequencies; a receiver having a pair of microphones carried by said vehicle and disposed on opposite sides of the forward path of travel of said vehicle to pick up the modulated compressional wave carrier after reflection in air from said object, two electrical channels each including an ultrasonic frequency tuned amplifier, a demodulator, and balanced modulator all connected together in sequence, means connecting the two audio oscillators of the transmitter to the balance modulators respectively, and a phase meter having opposing input terminals and calibrated with azimuth indications corresponding to phase differences of signals applied to opposing input terminals of the phase meter, said phase meter being connected to the balanced modulators of both channels for indicating any difference in phase between signals applied by the modulators to respective terminals of the phase meter, whereby said meter indicates the azimuth of location of said object with respect to the forward path of travel of said vehicle; an integrating circuit connected to the audio amplifiers of both channels for integrating amplified alternately detected audio signals obtained from the demodulators of both channels, and a range meter calibrated to indicate distances and connected to the integrating circuit, whereby the range meter indicates the distance from the object to the vehicle; another audio amplifier connected to the integrating circuit, and at least one loudspeaker connected to said other audio-amplifier whereby the loudspeaker emits sounds whose pitch depends on the position of said object with respect to the path of travel of the vehicle.

9. Apparatus for detecting an object with respect to a moving vehicle, comprising a transmitter including an ultrasonic frequency oscillator for generating an ultrasonic frequency carrier, a modulator, an astable multivibrator, two audio oscillators generating signals of two different audio frequencies, said audio oscillators being connected to opposite sides of said multivibrator so that said multivibrator passes in turn alternately signals produced by the two audio oscillators, said ultrasonic frequency oscillator and said multivibrator being connected to said modulator for modulating the alternately passed audio frequency signals upon said carrier; an amplifier connected to the modulator for amplifying the modulated carrier, and an ultrasonic frequency compressional wave generator connected to the amplifier for generating and radiating in air an ultrasonic frequency carrier modulated sequentially by two audio frequencies; a receiver having a pair of microphones carried by said vehicle and disposed on opposite sides of the forward path of travel of said vehicle to pick up the modulated compressional wave carrier after reflection in air from said object, two electrical channels each including an ultrasonic frequency tuned amplifier, a demodulator, and balanced modulator all connected together in sequence, means connecting the two audio oscillators of the transmitter to the balanced modulators respectively; an integrating circuit connected to the audio amplifiers of both channels for integrating amplified alternately detected audio signals obtained from the demodulators of both channels, and a range meter calibrated to indicate distances and connected to the integrating circuit, whereby the range meter indicates the distance from the object to the vehicle.

10. Apparatus for detecting an object with respect to a moving vehicle, comprising a transmitter including an ultrasonic frequency oscillator for generating an ultrasonic frequency carrier, a modulator, an astable multivibrator, two audio oscillators generating signals of two different audio frequencies, said audio oscillators being connected to opposite sides of said multivibrator so that said multivibrator passes in turn alternately signals produced by the two audio oscillators, said ultrasonic frequency oscillator and said multivibrator being connected to said modulator for modulating the alternately passed audio frequency signals upon said carrier, an amplifier connected to the modulator for amplifying the modulated carrier, and an ultrasonic frequency compressional wave generator connected to the amplifier for generating and radiating in air an ultrasonic frequency carrier modulated sequentially by two audio frequencies; a receiver having a pair of microphones carried by said vehicle and disposed on opposite sides of the forward path of travel of said vehicle to pick up the modulated compressional wave carrier after reflection in air from said object, two electrical channels each including an ultrasonic frequency tuned amplifier, a demodulator, and balanced modulator all connected together in sequence, means connecting the two audio oscillators of the transmitter to the balanced modulators respectively, an integrating circuit connected to the audio amplifiers of both channels for integrating amplified alternately detected audio signals obtained from the demodulators of both channels, and a range meter calibrated to indicate distances and connected to the integrating circuit, whereby the range meter indicates the distance from the object to the vehicle; another audio amplifier connected to the integrating circuit, and at least one loudspeaker connected to said other audio amplifier whereby the loudspeaker emits sounds whose pitch depends on the position of said object with respect to the path of travel of the vehicle.

References Cited by the Examiner

UNITED STATES PATENTS

| 1,973,673 | 9/1934 | Rice | 340—16 X |
| 2,277,464 | 3/1942 | Taylor | 343—16 |
| 3,130,385 | 4/1964 | Galloway | 340—6 |

CHESTER L. JUSTUS, *Primary Examiner.*